US006968197B2

(12) United States Patent
Mori et al.

(10) Patent No.: US 6,968,197 B2
(45) Date of Patent: Nov. 22, 2005

(54) APPARATUS AND METHOD FOR ACQUISITION OF COMMUNICATION QUALITY

(75) Inventors: Shinichi Mori, Kanagawa (JP); Tetsuro Imai, Kanagawa (JP); Yoshihiro Ishikawa, Kanagawa (JP); Mikio Iwamura, Kanagawa (JP)

(73) Assignee: NTT DoCoMo, Inc., Tokyo (JP)

( * ) Notice: Subject to any disclaimer, the term of this patent is extended or adjusted under 35 U.S.C. 154(b) by 655 days.

(21) Appl. No.: 09/825,817

(22) Filed: Apr. 4, 2001

(65) Prior Publication Data

US 2002/0022463 A1 Feb. 21, 2002

(30) Foreign Application Priority Data

Apr. 6, 2000 (JP) ........................................ 2000-105484

(51) Int. Cl.[7] .......................... H04B 15/00; H04L 7/00; H04J 3/06
(52) U.S. Cl. ....................... 455/502; 455/506; 455/524; 455/135; 455/226.2; 375/354; 375/360; 375/150; 375/152; 370/503; 370/509; 370/342
(58) Field of Search ...................... 370/441, 502–506, 370/509–514, 524, 132–137, 226.2, 277.2, 342; 375/147, 149, 150, 152, 342, 354–368

(56) References Cited

U.S. PATENT DOCUMENTS

| 5,084,891 | A | * | 1/1992 | Ariyavisitakul et al. | .... 714/775 |
|---|---|---|---|---|---|
| 5,696,762 | A | * | 12/1997 | Natali et al. | ................. 370/320 |
| 5,812,593 | A | * | 9/1998 | Kaku | .......................... 375/150 |
| 6,195,343 | B1 | * | 2/2001 | Watanabe | .................... 370/335 |
| 6,484,034 | B1 | * | 11/2002 | Tsunehara et al. | ....... 455/456.6 |
| 6,522,625 | B1 | * | 2/2003 | Hayashi et al. | ............. 370/208 |
| 6,549,545 | B1 | * | 4/2003 | Yamamoto et al. | ......... 370/508 |
| 6,571,099 | B1 | * | 5/2003 | Kim et al. | .................. 455/442 |
| 6,741,667 | B1 | * | 5/2004 | Suda | .......................... 375/354 |
| 6,754,255 | B1 | * | 6/2004 | Yano et al. | .................. 375/149 |

FOREIGN PATENT DOCUMENTS

| EP | 0 989 685 A2 | 3/2000 | ........... H04B/1/707 |
|---|---|---|---|
| JP | 09-261126 | 10/1997 | |
| JP | 09-270734 | 10/1997 | |
| JP | 10-112673 | 4/1998 | |
| JP | 11-284548 | 10/1999 | |
| JP | 2000-078057 | 3/2000 | |
| KR | 0164099 | 12/1998 | ............ H04B/1/69 |
| WO | WO 97/40398 | 10/1997 | ............. G01S/1/04 |

OTHER PUBLICATIONS

"A Coherent Detection System with a Suppressed Pilot Channel for DS/CDMA Sustems", Sadayuki Abeta, Seiichi Sampei and Norihiko Morinaga; Faculty of Engineering, Osaka University, Suita, Japan 565; 1996 Scripta Technica, Inc. Electronics and Communications in Japan, Part 1, vol. 79, No. 4, 1996 pp. 95–102.
DS/CDMA Coherent Detection System with a Suppressed Pilot Channel Sadayuki Abeta, Seiichi Sampei and Norihiko Morinaga 1994 IEEE.
Austrian Patent office Service and Information Sector (TRF) Search Report.
Official Notice of Rejection Case No.: DCMH110429 Patent Application No.: 2000–105484.

* cited by examiner

Primary Examiner—Duc M. Nguyen
(74) Attorney, Agent, or Firm—Workman Nydegger

(57) ABSTRACT

In mobile communication systems employing the CDMA method, the communication quality is acquired from the CDMA pilot channel. A communication quality acquisition apparatus comprises a delay profile acquisition unit comprising a control unit, synchronization unit and measurement unit, in addition to a data storage unit. The communication quality is measured by the synchronization unit and the measurement unit which are alternatively controlled by the control unit. When the communication quality is acquired through the CDMA pilot channel, the data acquisition efficiency can be significantly raised.

10 Claims, 23 Drawing Sheets

FIG.11A

SET CODE TO BE MEASURED

| SEARCH NUMBER | CODE NUMBER | NAME OF BASE STATION |
|---|---|---|
| 1. | 3 | BASE STATION A |
| 2. | 6 | BASE STATION B |
| 3. | 120 | BASE STATION C |
| 4. | 55 | BASE STATION D |
| 5. | 412 | BASE STATION E |
| 6. | 501 | BASE STATION F |
| 7. | 9 | BASE STATION G |
| 8. | 378 | BASE STATION H |

FIG.11B

DETECTION REQUESTED CODE LIST

| SEARCH NUMBER | CODE NUMBER | NAME OF BASE STATION |
|---|---|---|
| 1. | 3 | BASE STATION A |
| 2. | 6 | BASE STATION B |
| 3. | 120 | BASE STATION C |
| 4. | 55 | BASE STATION D |
| 5. | 412 | BASE STATION E |
| 6. | 501 | BASE STATION F |
| 7. | 9 | BASE STATION G |
| 8. | 378 | BASE STATION H |

FIG.11C

DETECTION REQUESTED CODE LIST

| SEARCH NUMBER | CODE NUMBER | NAME OF BASE STATION |
|---|---|---|
| 1. | 3 | BASE STATION A |
| 2. | 6 | BASE STATION B |
| 3. | 120 | BASE STATION C |
| 4. | 55 | BASE STATION D |
| 5. | 412 | BASE STATION E |
| 6. | 501 | BASE STATION F |
| 7. | 9 | BASE STATION G |
| 8. | 378 | BASE STATION H |

EXAMPLE OF COMPLETED DETECTION FOR CODE-3 AND CODE-6

FIG.11D

DETECTION COMPLETED CODE LIST

| SEARCH NUMBER | CODE NUMBER | NAME OF BASE STATION | SYNCHRO-NIZATION POINT |
|---|---|---|---|
| 1. | 3 | BASE STATION A | 1206 |
| 2. | 6 | BASE STATION B | 408 |
| 3. | | | |
| 4. | | | |
| 5. | | | |
| 6. | | | |
| 7. | | | |
| 8. | | | |

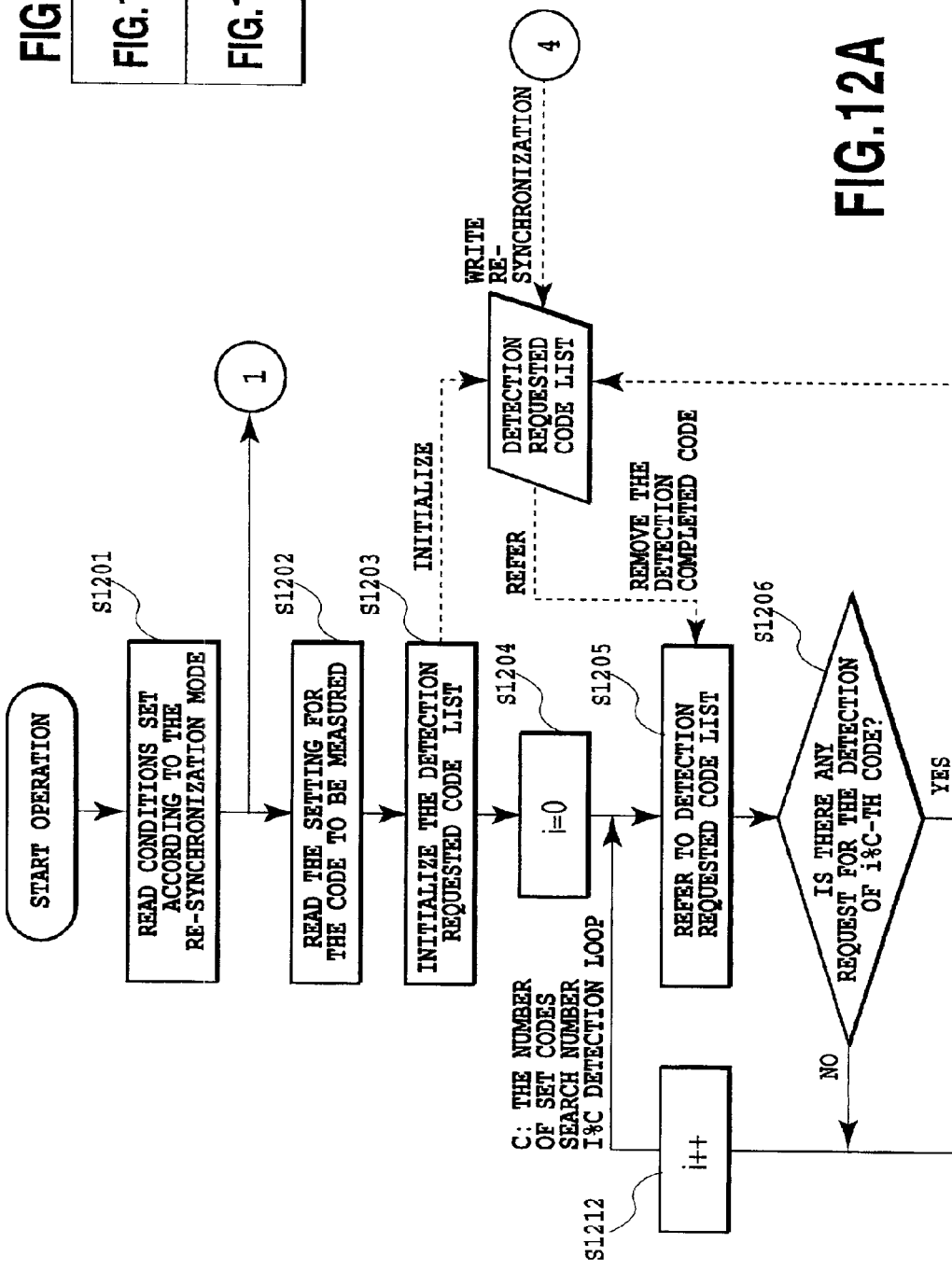

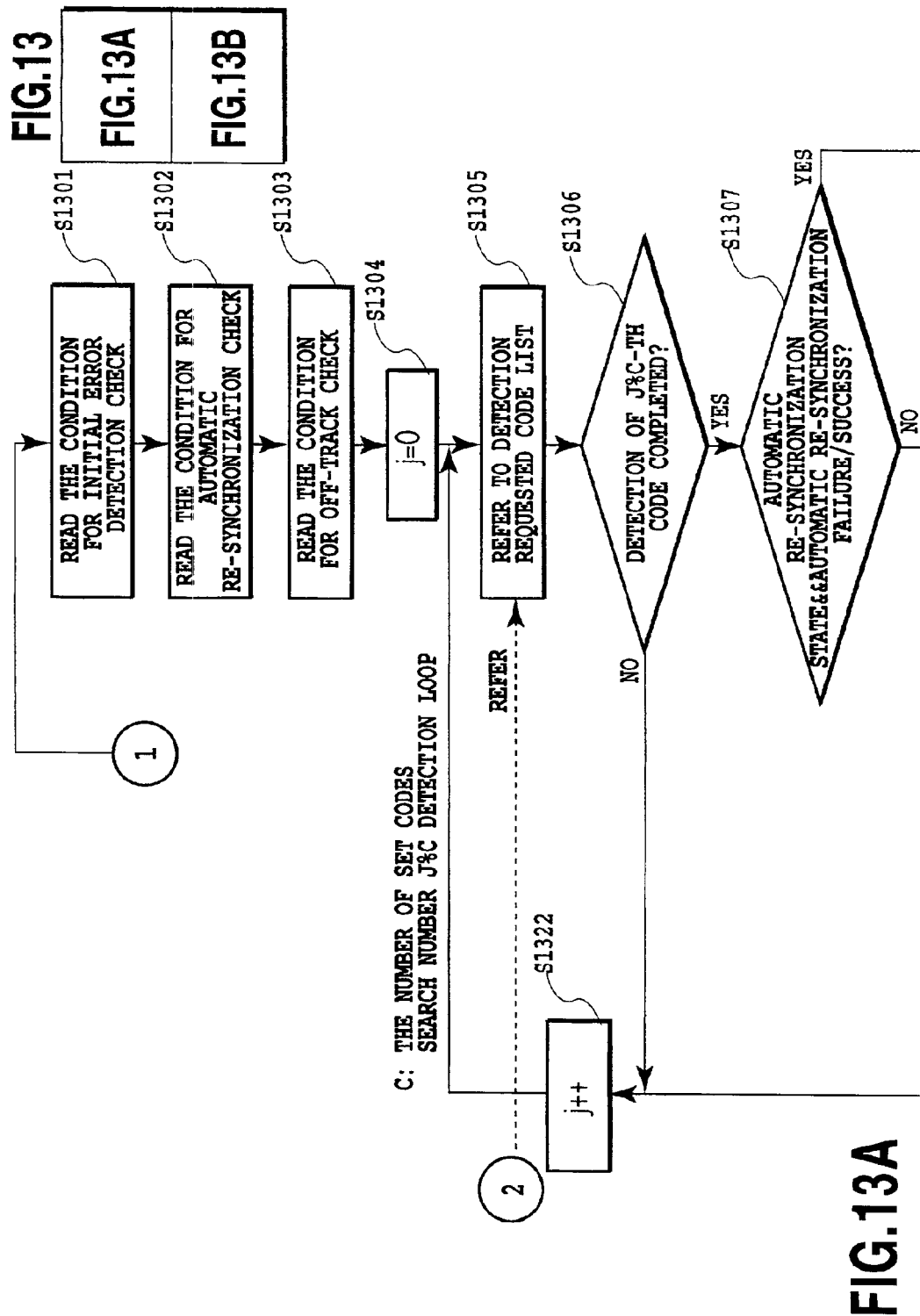

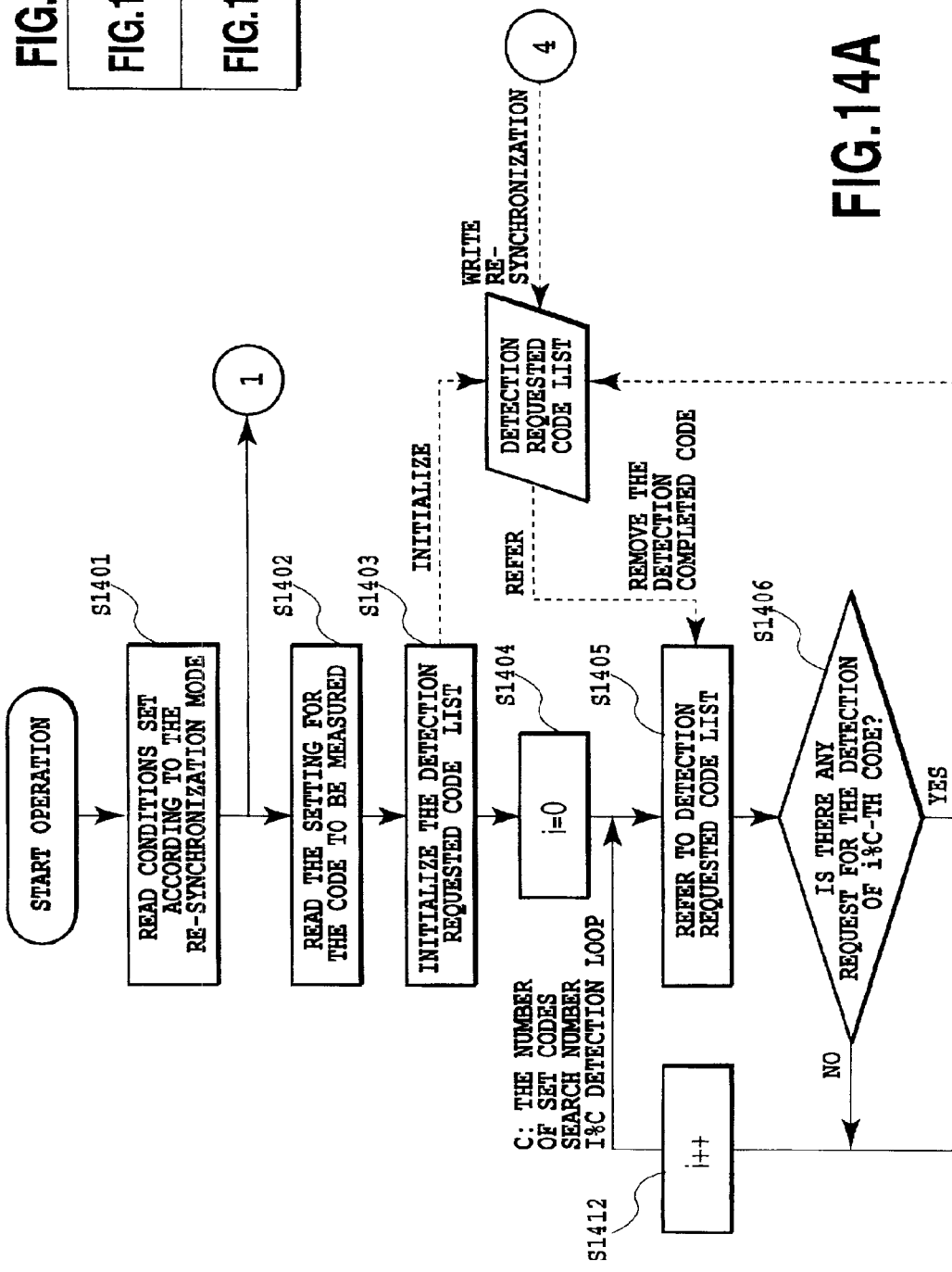

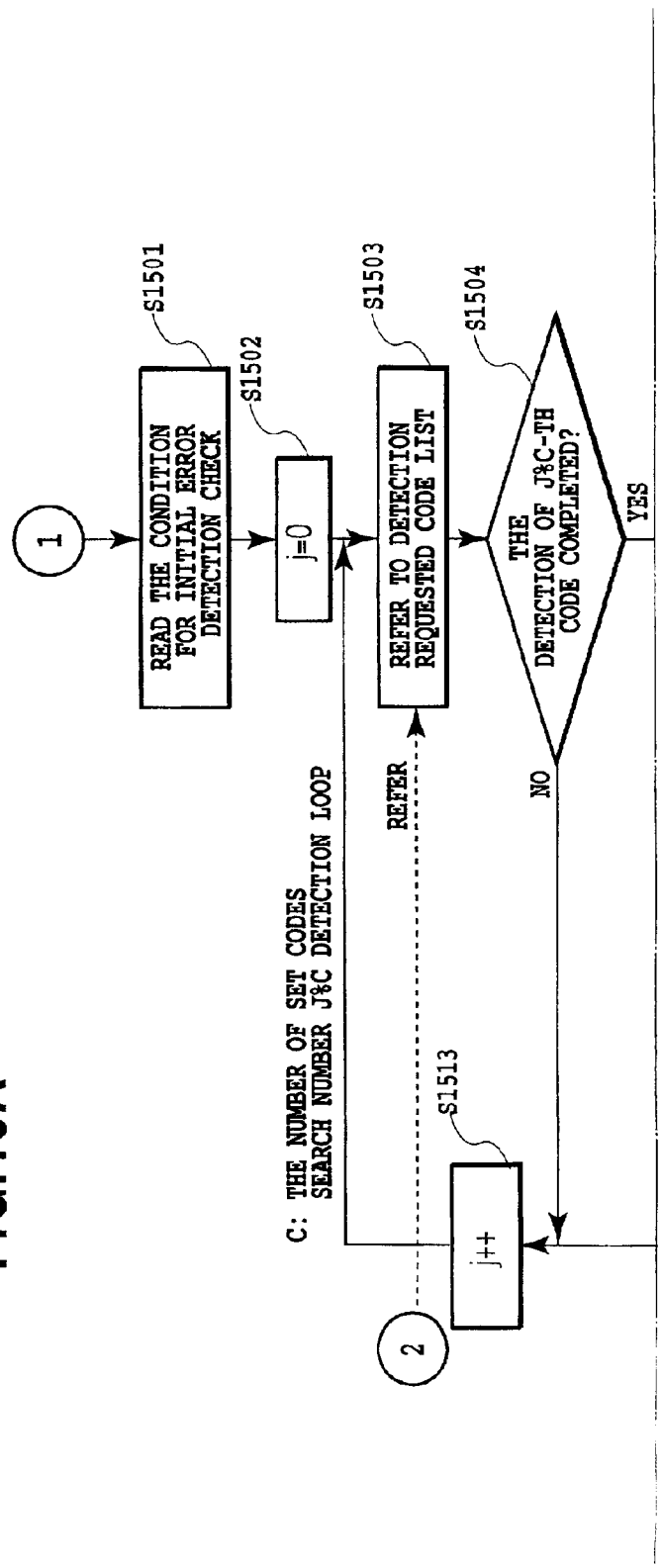

APPARATUS AND METHOD FOR ACQUISITION OF COMMUNICATION QUALITY

This application claims priority under 35 U.S.C. 119 to patent application Ser. No. 2000-105484 filed Apr. 6, 2000 in Japan, the content of which is incorporated hereinto by reference.

BACKGROUND OF THE INVENTION

1. Field of the Invention

The present invention generally relates to communication quality acquisition apparatuses and methods employed in cellular mobile communication systems using spread signals such as CDMA(Code Division Multiple Access), and more specifically, to an apparatus and a method for acquiring communication quality through the CDMA pilot channel in the service area.

2. Description of the Related Art

In the prior art communication method that divides a given band into several channels and then conducts communications through such channels, the communication quality is affected by thermal noise caused by decrease in receiving power and interference noise in the co-channel and adjacent channels caused by the reuse of spatially the co-channel and adjacent channels. Then, its communication quality is identified by measuring the receiving power of the channel sent from the operating base station. Such receiving power can be measured by extracting the signal spectrum in each desired channel by the use of frequency converters and frequency selection filters and then measuring the power provided from each filter.

However, in the case of the CDMA method, which is regarded as the most promising one among the future mobile communication methods, the acquisition of communication quality in the service area should be conducted in a different way.

In the CDMA method, since the allocated band is not divided into several channels but shared by all the communication channels, those channels are distinguished from each other with different codes. Therefore, in order to receive signals in a given channel for the acquisition of communication quality, the code assigned to each channel must be identified and synchronization must be established by detecting the code interval. Because a number of channels are required to be measured at the same time for the acquisition of communication quality, a parallel data processing is necessary for code synchronization. Further, since the CDMA method improves communication quality by using a wide band, the delay profile, which is two-dimensional data, must be acquired for the acquisition of communication quality. Then, the CDMA method poses such problems that its data processing becomes very complicated when implementing code synchronization over a number of channels to acquire communication quality and that the amount of data increases along with the acquisition of delay profile.

Delay during code synchronization causes failed data acquisition and thus lowers the code synchronization accuracy. It also leads to a problem of extended "measurement window", which is the time interval for the measurement of delay profile. As a result, the amount of data processing grows during measurement and the portion of meaningful data in the acquired data decreases. In addition, such an increase in the data amount caused by the acquisition of delay profile shortens the meaning data acquisition time, thus lowering the processing efficiency.

SUMMARY OF THE INVENTION

This invention has been made to solve the above problems and its object is, therefore, to provide an apparatus and a method for quick and efficient acquisition of communication quality. For this purpose, the invention realizes a quick code synchronization, through control of a code synchronization unit and a delay profile measurement unit, over a number of channels handled in parallel by conducting measurement using the CDMA pilot channel in the service area where the mobile communication services are provided by code-spread methods like CDMA. Then the improvements of code synchronization accuracy and speed enable to efficiently detect meaningful delay profile. In addition, the measurement window can be narrowed and the delay profile acquisition process is optimized. As a result, the amount of data to be acquired is reduced so that the communication quality may be acquired efficiently.

In the first invention, a communication quality acquisition apparatus receives the CDMA pilot channels sent from a plurality of wireless base stations through the use of spread signals different from each other and has an acquisition means for acquiring delay profile based on the spread signals in the CDMA pilot channels and a storage means for storing the delay profile acquired by the acquisition means. This configuration enables to reduce the amount of necessary data and thereby efficiently acquire communication quality.

In the second invention, the acquisition means according to the first invention has a synchronization means for establishing synchronization based on the spread signals in the CDMA pilot channels, a measurement means for acquiring delay profile by reverse spreading the spread signals in the CDMA pilot channels and a control means for controlling the synchronization means and measurement means. This configuration enables to conduct the synchronization detection for a plurality of CDMA channels and their re-synchronization in parallel at a time and at a high efficiency.

In the third invention, the storage means according to the first invention attaches the information of time and location to the delay profile acquired by the acquisition means and stores the information in the storage means.

In the fourth invention, the control means according to the second invention controls the synchronization means and measurement means based on the conditions set by the user for initial error detection check, re-synchronization of each mode, off-track check and automatic re-synchronization check, or on information set for the code to be measured. This configuration enables to reduce fails in data acquisition due to delays that occur during code synchronization. Then meaningful data is not missed and the necessary amount of data can be minimized.

In the fifth invention, the control means according to the second invention controls the measurement means based on the synchronization point information acquired by the synchronization means. This configuration enables to narrow the width of the "measurement window", which is the time interval for measurement of delay profile.

In the sixth invention, the control means according to the second invention controls the synchronization means based on the check results of initial error detection, automatic re-synchronization or off-track acquired by the measurement means. This configuration enables to raise accuracy in detecting synchronization points and to know the exact location of meaningful delay profile.

The seventh invention is a communication quality acquisition method comprising: the step of receiving CDMA channels sent from a plurality of wireless base stations through the use of spread signals different from each other; the acquisition step of acquiring delay profile based on the spread signals in the CDMA channels; and the storage step of storing the delay profile acquired by the acquisition step. This method enables to reduce the amount of necessary data and acquire communication quality efficiently.

In the eighth invention, the acquisition step according to the seventh invention comprises: the step of establishing synchronization based on the spread signals in the CDMA pilot channels; the measurement step of acquiring delay profile by reverse spreading the spread signals in the CDMA pilot channels; and the control step of controlling the synchronization step and measurement step. This method enables to conduct synchronization detection for a plurality of CDMA channels and their re-synchronization in parallel at a time and at a high efficiency.

In the ninth invention, at the storage step according to the seventh invention, the information of time and location is attached to the delay profile acquired at the acquiring step and then stored at the storage step.

In the tenth invention, at the control step according to the seventh invention, the synchronization step and measurement step are controlled based on the conditions set by the user for initial error detection check, re-synchronization of each mode, off-track check and automatic re-synchronization check, or on information set for the code that will be measured. This method enables to reduce the failure in data acquisition due to delay during code synchronization. Then meaningful data is not missed and the necessary amount of data can be minimized.

In the eleventh invention, the control step according to the eighth invention controls the measurement step based on the synchronization point information acquired at the synchronization step. This method enables to narrow the width of "measurement window", which is the time interval for measurement of delay profile.

In the twelfth invention, the control step according to the eighth invention controls the synchronization step based on the check results of initial error detection, automatic re-synchronization or off-track. This method enables to raise accuracy in detecting synchronization points and to know the exact location of meaningful delay profile.

The above and other objects, features and advantages of the present invention will become more apparent from the following description of embodiments thereof taken in conjunction with the accompanying drawings.

BRIEF DESCRIPTION OF THE DRAWINGS

FIGS. 11A to 11D are diagrams illustrating examples of the measurement code settings, detection requested code list and detection completed code list according to the invention;

FIG. 12 is a diagram showing the relationship of FIGS. 12A and 12B;

FIGS. 12A and 12B are flow charts illustrating examples of the synchronization point detection for the case where the re-synchronization mode is set at the automatic re-synchronization and an example of the synchronization detection process;

FIG. 13 is a diagram showing the relationship of FIGS. 13A and 13B;

FIGS. 13A and 13B are flow charts illustrating examples of the synchronization point detection for the case where the re-synchronization mode is set at the automatic re-synchronization and an example of the re-synchronization detection process;

FIG. 14 is a diagram showing the relationship of FIGS. 14A and 14B;

FIGS. 14A and 14B are flow charts illustrating examples of the synchronization point detection for the case where the re-synchronization mode is set at the manual re-synchronization and an example of the synchronization detection;

FIG. 15 is a diagram showing the relationship of FIGS. 15A and 15B;

FIGS. 15A and 15B are flow charts illustrating examples of the synchronization point detection for the case where the re-synchronization mode is set at the manual re-synchronization and an example of the re-synchronization detection.

DESCRIPTION OF THE PREFERRED EMBODIMENT

Figure 1:
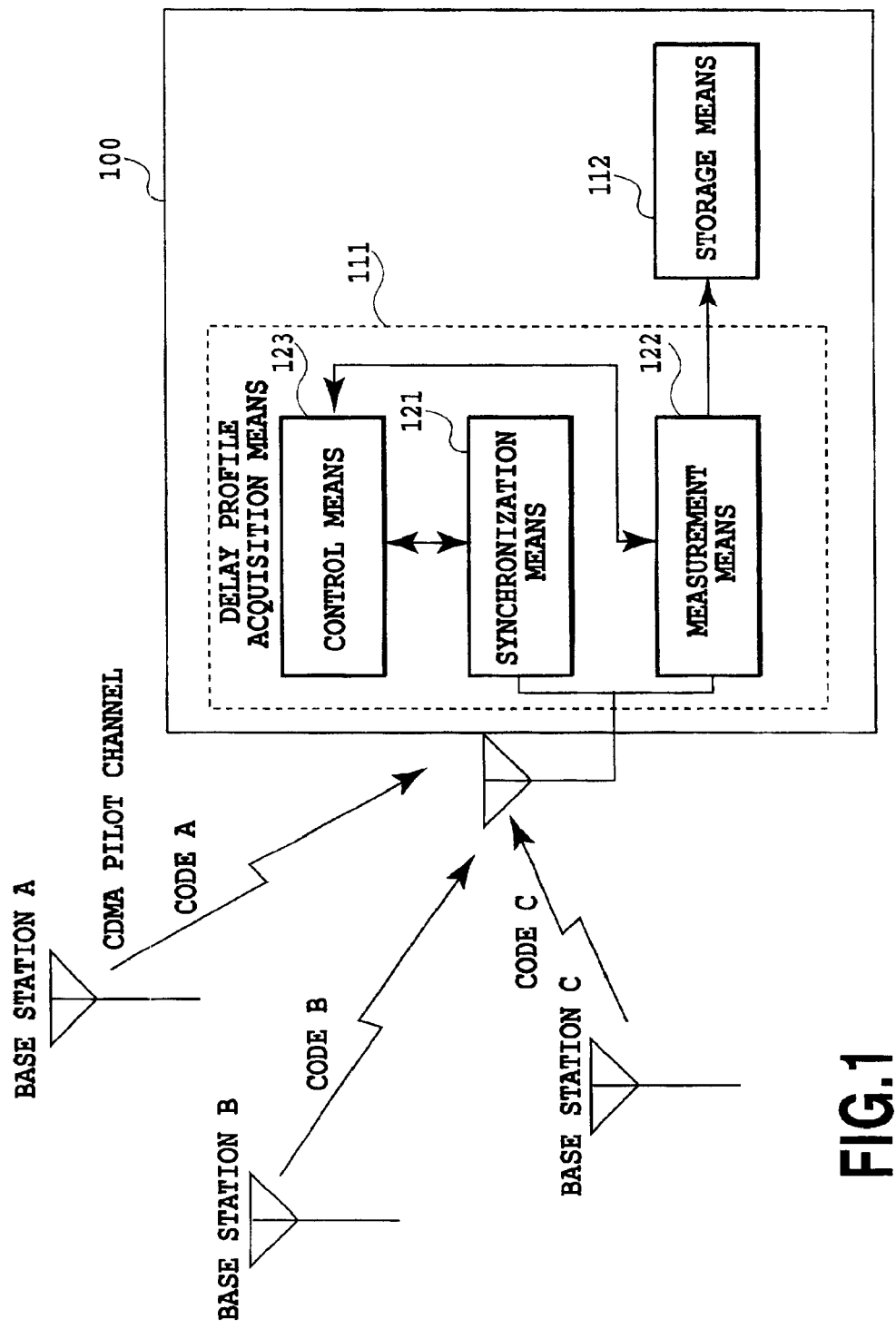
FIG. 1 is a block diagram illustrating an example of the communication quality acquisition apparatus according to the present invention.

FIG. 1 shows a block diagram illustrating an example of the communication quality acquisition apparatus according to the present invention. The communication quality acquisition apparatus 100 has a delay profile acquisition unit 111 and a storage unit 112. The communication quality acquisition apparatus 100 receives CDMA pilot channels sent from base stations (base station A, B, C) of different codes (codes A, B, C) at one time. The delay profile acquisition unit 111 further comprises a synchronization unit 121, a measurement unit 122 and a control unit 123. The control unit 123 controls the synchronization unit 121 and the measurement unit 122.

Figure 2:
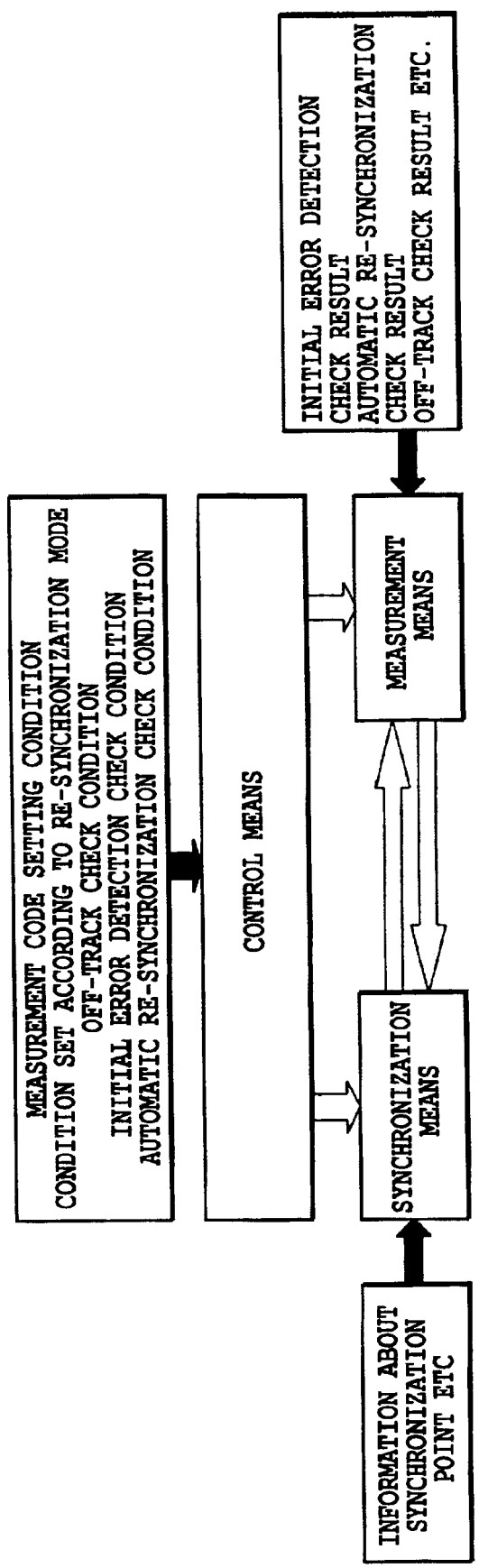
FIG. 2 is a schematic diagram illustrating the control process in the delay profile measurement unit shown in FIG. 1.

FIG. 2 is a schematic diagram illustrating the control process in the delay profile measurement unit 111 shown in FIG. 1. The control process executed by the control unit 123 uses measurement code setting information, re-synchronization mode setting conditions, off-track check conditions, initial error detection check conditions, and automatic re-synchronization check conditions, which are all determined by the user. Also used are synchronization point information obtained by the synchronization unit 121, and initial error detection check results, automatic re-synchronization check results and off-track check results obtained by the measurement unit 122.

Figure 3A:
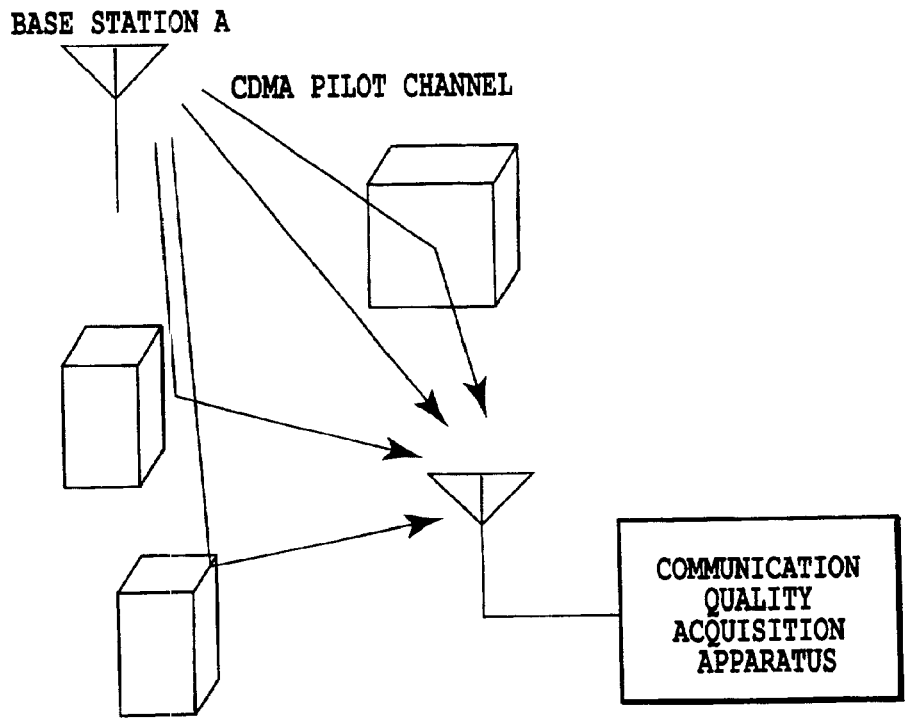
FIG. 3A shows a schematic diagram illustrating the reception of a CDMA pilot channel sent from a specific base station.
Figure 3B:
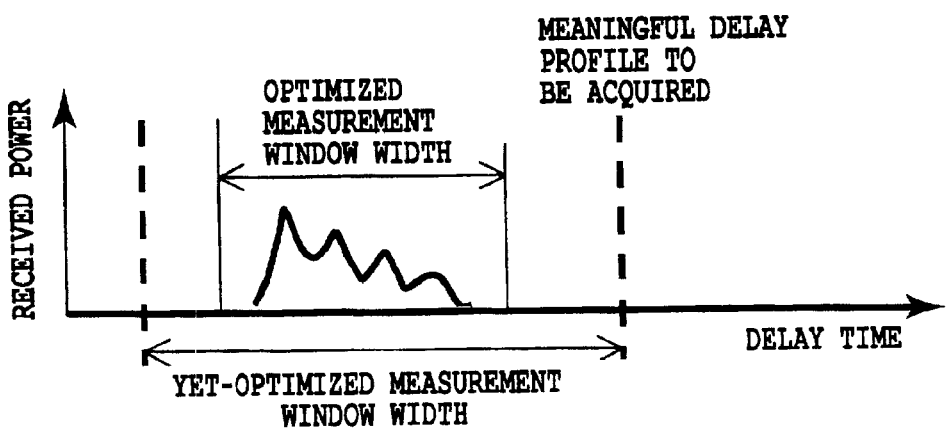
FIG. 3B shows an example of delay profile.

FIG. 3A shows a schematic diagram illustrating the reception of a CDMA pilot channel sent from a specific base station. Since communication quality is improved by using a wide band in the CDMA method, the acquisition of the delay profile is important. FIG. 3B shows an example of delay profile. The delay profile is the electric power level of radio waves which are drawn along the delay time of each radio wave arriving at a receiving point in multiplexed propagation paths. In order to acquire delay profile, it is necessary to detect the code used in the CDMA pilot channel and its repetition timing in advance and then establish code synchronization. Code synchronization has to be established for every CDMA channel that is to be measured. Further, code synchronization must be implemented not only at the beginning of measurement but also during measurement each time the measurement window is renewed and off-track takes place.

The amount of acquired data should be minimized to prevent data growth resulting from the acquisition of the delay profile that is two-dimensional data. The width of the measurement window must be optimized. This can be optimized by increasing the frequency of code synchronization and refreshing the measurement window to narrow the measurement window. Only meaningful data of delay profile is thereby stored.

Figure 4:
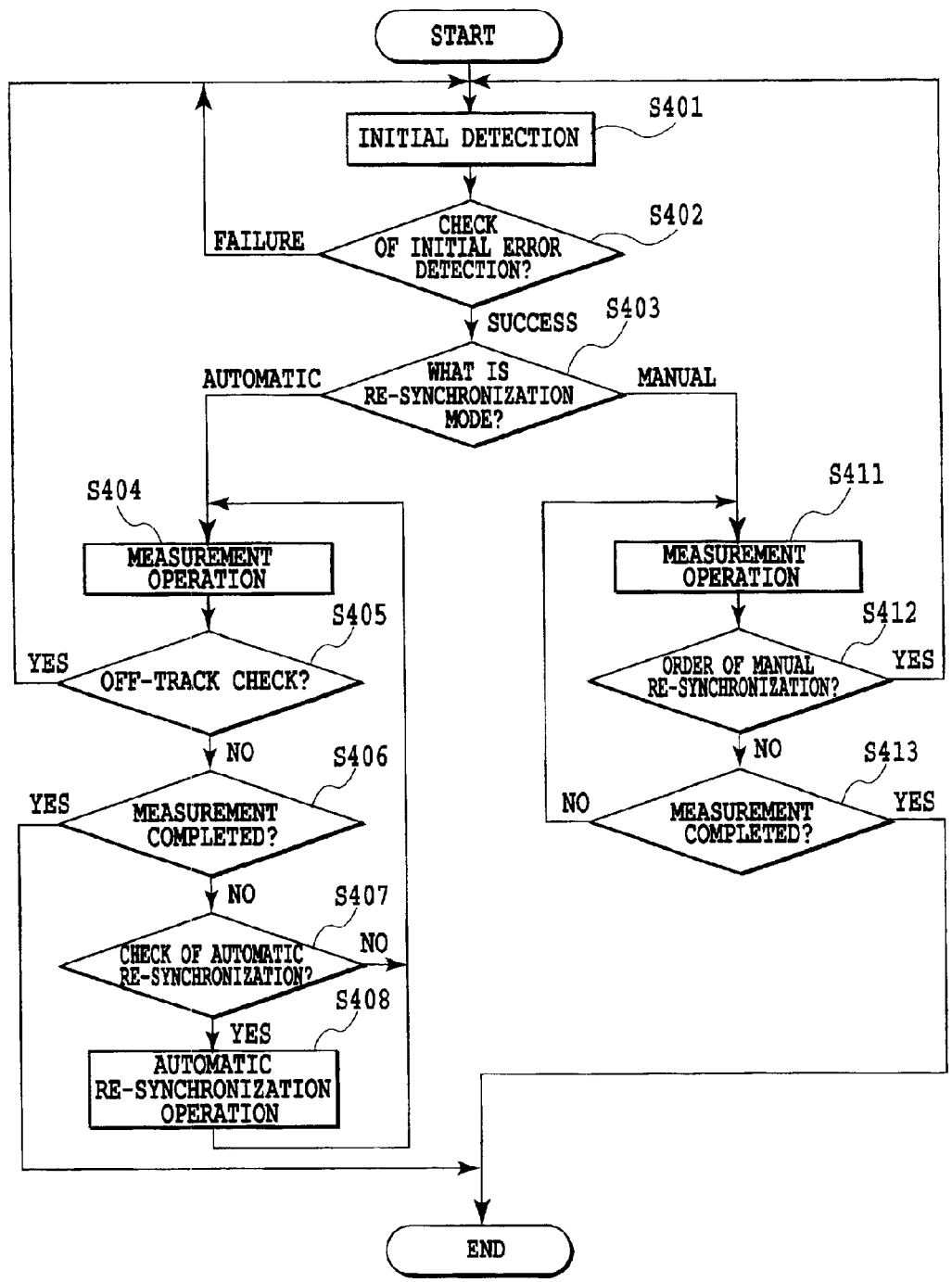
FIG. 4 is a flow chart illustrating an example of the method for acquiring delay profile when the communication quality acquisition apparatus according to the invention receives a CDMA pilot channel sent from a given base station.

FIG. 4 shows an example of the method for acquiring delay profile when the communication quality acquisition apparatus receives a CDMA pilot channel sent from a specific base station. When the communication quality acquisition apparatus starts operation, the synchronization unit 121 detects the synchronization point and conducts the initial acquisition of the code used in the CDMA pilot channel (S401). Next, initial error detection check is executed to determine whether the obtained initial error detection is the right one or not by the measurement unit 122 (S402). If it is determined as a failure by this initial error detection check, the initial detection will be redone. If it is determined as successful, the mode of re-synchronization is read (S403) to conduct different operations based on the specified mode.

If the re-synchronization mode is set at "automatic", the measurement (S404) proceeds along with the off-track check (S405), measurement completion check (S406) and automatic re-synchronization check (S407). If an off-track is detected in the off-track check (S405), the operation returns to the initial detection (S401). If an automatic re-synchronization is determined to do by the automatic re-synchronization check (S407), the current synchronization point is maintained, data measurement and storage are implemented, while the automatic re-synchronization (S408) is carried out to detect a new synchronization point.

On the other hand, if the re-synchronization mode is set at "manual", the measurement (S411) is conducted along with the manual re-synchronization order check (S412) and the measurement completion check (S413). The above measurement operation (S411) is continued until an order for manual re-synchronization is issued. When a manual re-synchronization order is issued, the operation returns to the initial detection (S401).

Figure 5:
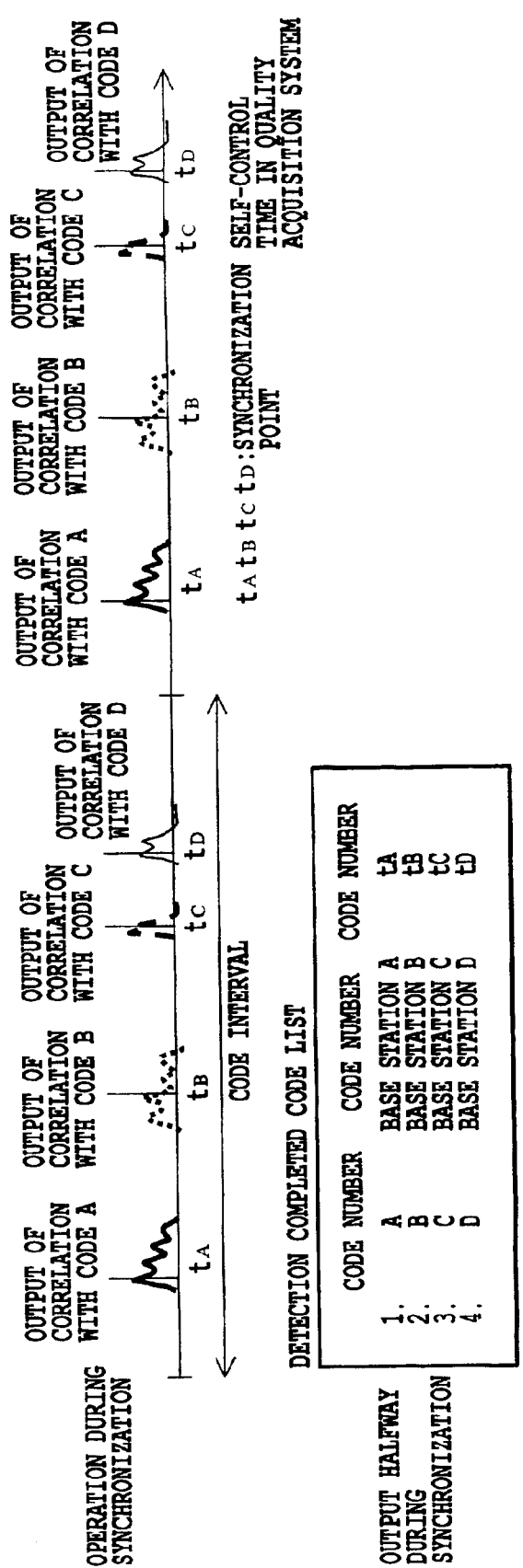
FIG. 5 is a schematic diagram illustrating an example of the synchronization point detection process that the synchronization unit executes during the initial detection process shown in FIG. 4.

FIG. 5 shows an example of the synchronization point detection that the synchronization unit executes during the initial detection (S401) shown in FIG. 4. During the synchronization point detection, the correlation between the received signal and the reference signal for each code is provided by a correlation examination. However, only one correlation result is given during each code interval because the code synchronization has not been established. The synchronization point is identified by, for example, the location presenting the strongest correlation for each code and provided to the detection completed code list (described later) as an output given halfway in the synchronization process.

Figure 6:
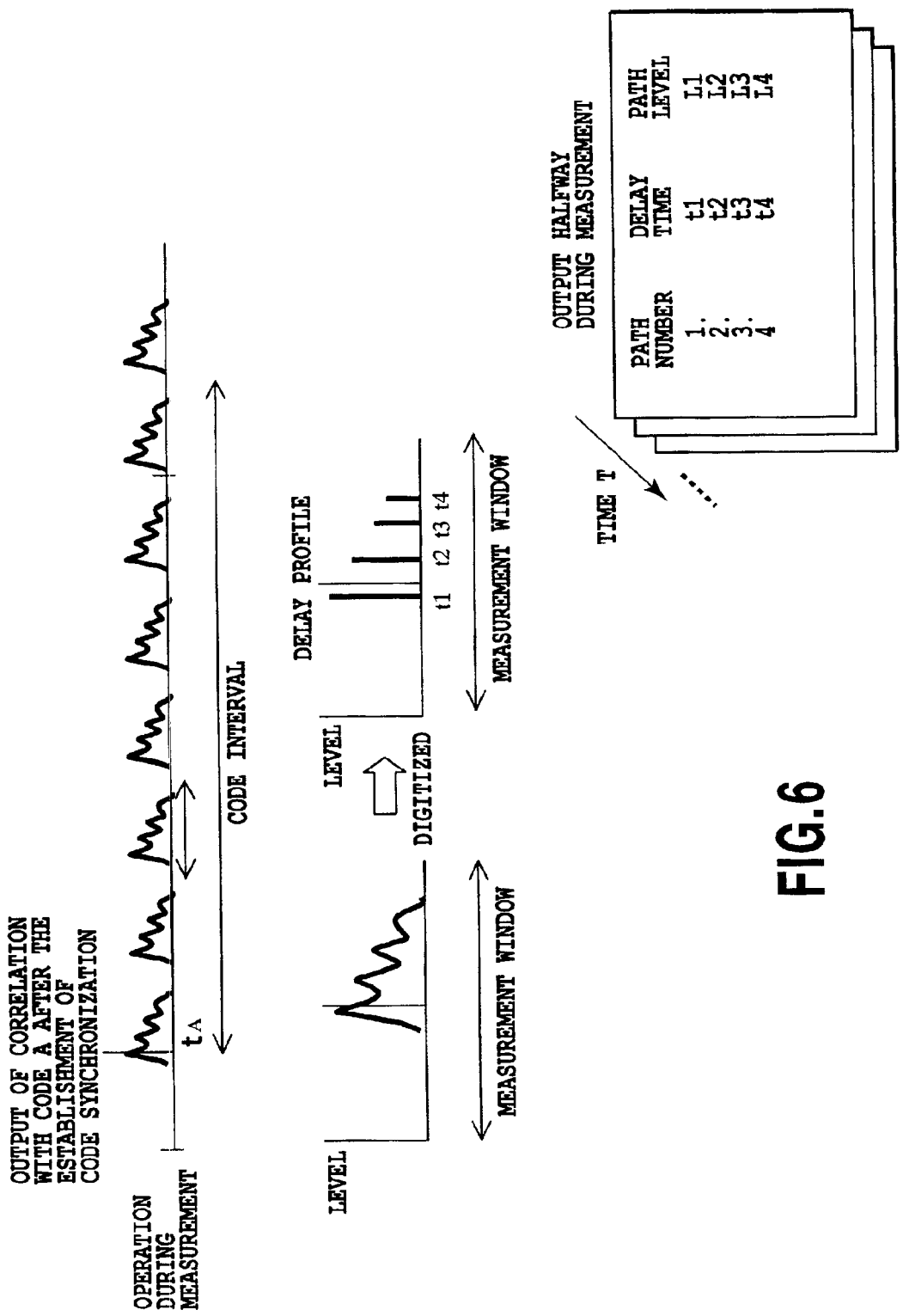
FIG. 6 is a schematic diagram illustrating an example of acquiring delay profile provided by the measurement unit according to the invention.

FIG. 6 shows an example of acquiring delay profile by the measurement method. The measurement unit 122 provides the degree of correlation for each code based on the synchronization point information indicated by the output given halfway in the synchronization process. Now that code synchronization has been established, correlation is given for each portion of the partial correlation intervals. This output of correlation is digitized to meet the form suitable for data storage. Later, it will be correlated with measurement time to form a pair of path level corresponding to delay time. The delay profile is thereby provided as an output given halfway in the measurement process.

Figure 7A:
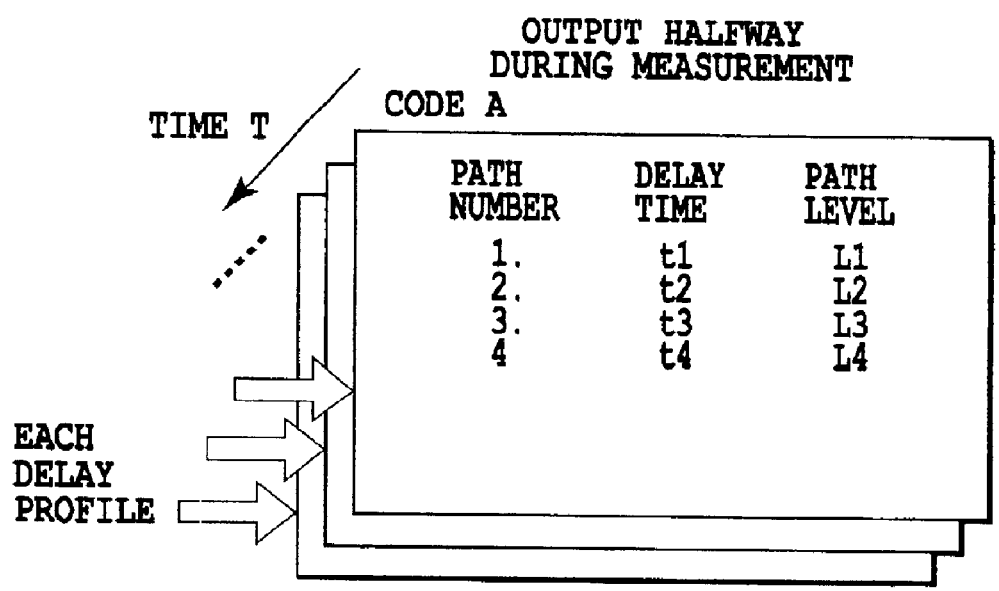
FIG. 7A is a schematic diagram illustrating an example of acquiring delay profile.
Figure 7B:
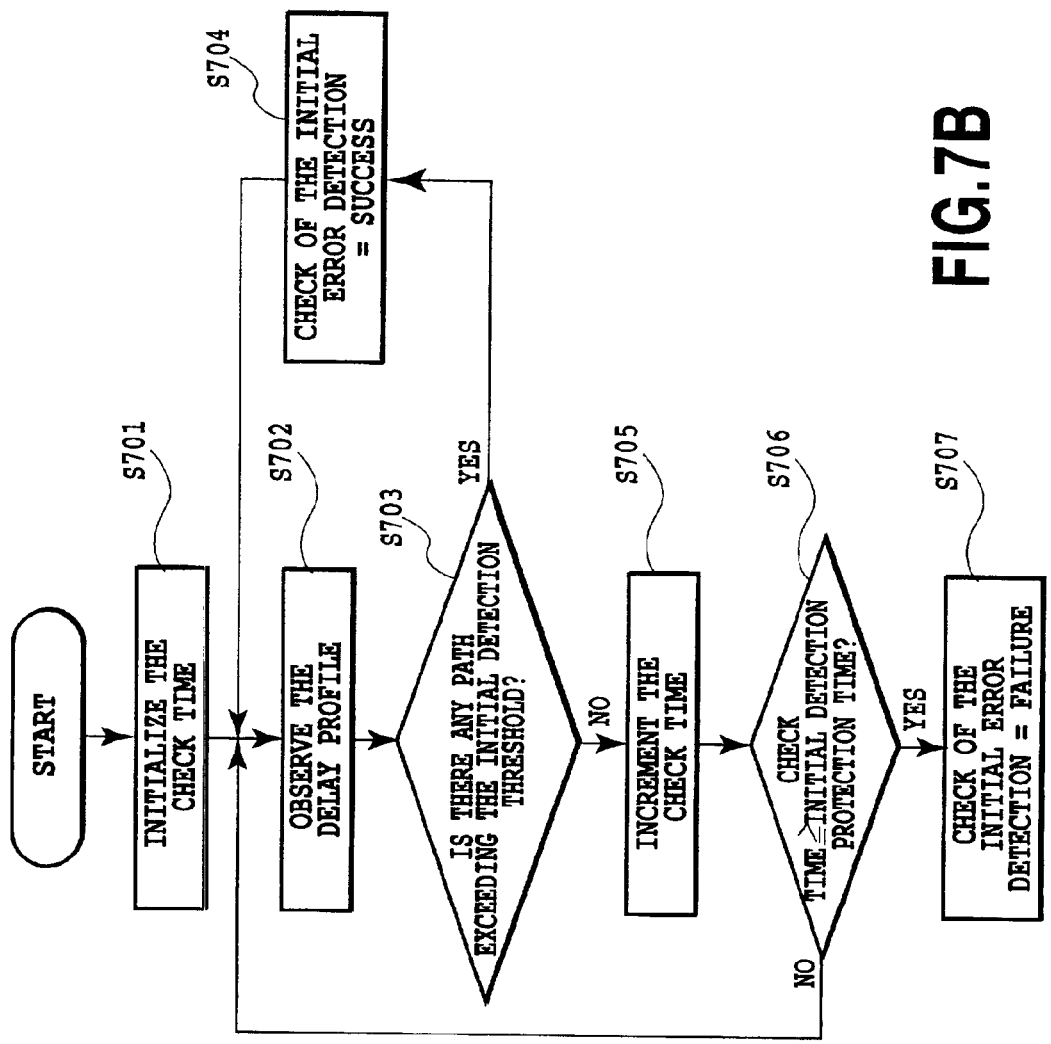
FIG. 7B is a flow chart illustrating an example of how to check the initial error detection shown in FIG. 4.

FIG. 7B shows an example of the initial error detection check (S402) shown in FIG. 4. After the initialization of the check time (S701), the delay profile is observed (S702) as an output given halfway in the measurement process. If a path is detected that exceeds the initial detection threshold during the operation of determining whether there is a path exceeding the initial detection threshold (S703), the initial error detection is determined as successful (S704). If there is no path detected that exceeds the initial detection threshold, the check time is incremented (S705), and the check time and the initial detection protection time are compared with each other (S706). The initial error detection is determined as a failure (S707), if the check time is equal to or longer than the initial detection protection time, namely, only if the period of no path that exceeds the initial detection threshold is equal to or longer than the initial detection protection time. Note that the initial detection threshold and the initial detection protection time are parameters that the user is allowed to determine as the initial error detection check conditions.

Figure 8A:
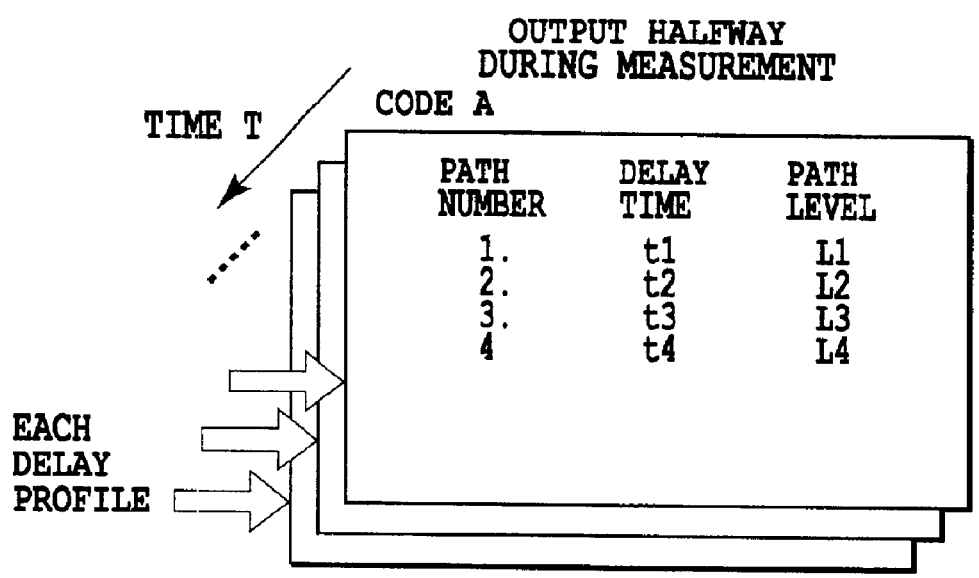
FIG. 8A is a schematic diagram illustrating an example of acquiring delay profile.
Figure 8B:
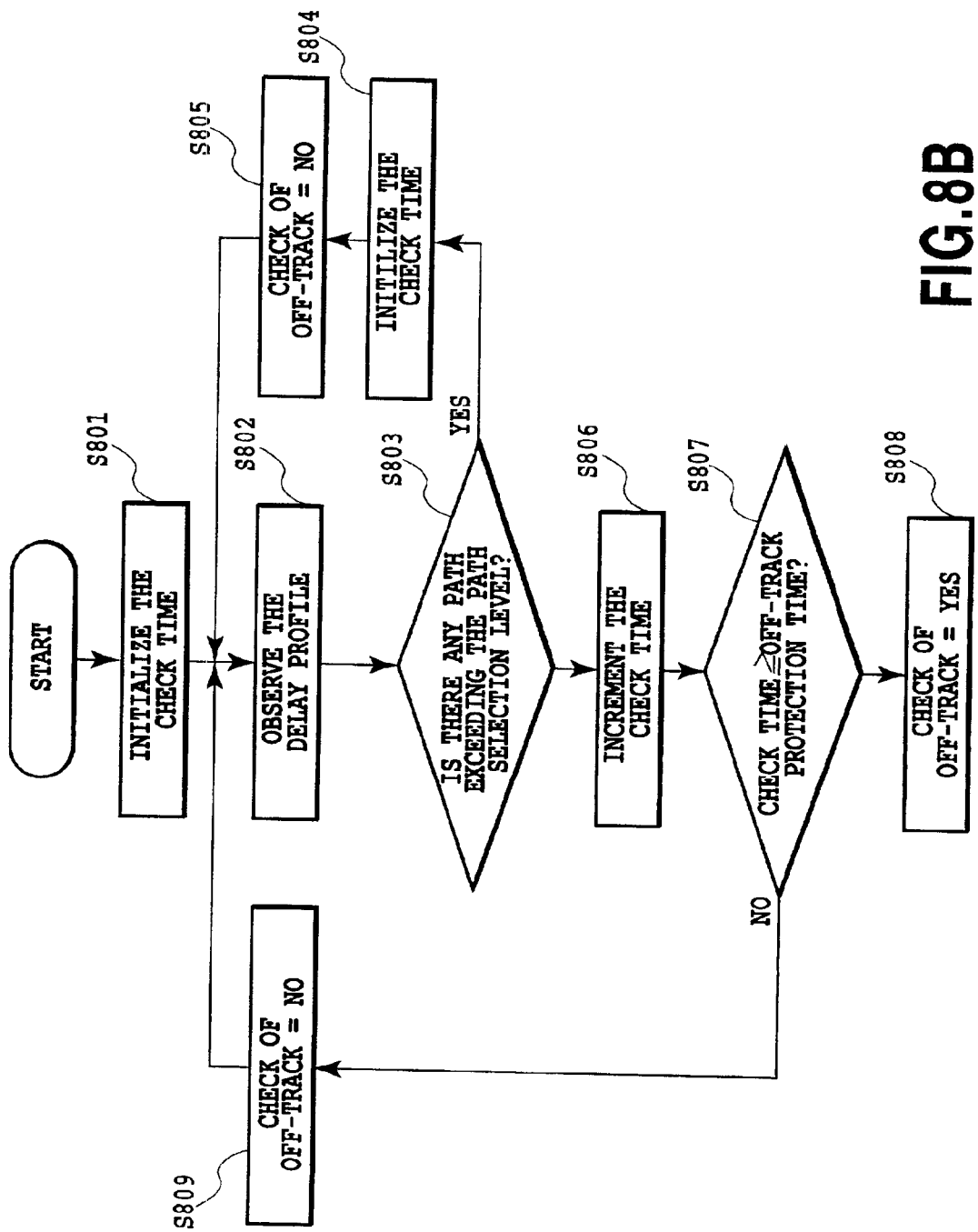
FIG. 8B is a flow chart illustrating an example of how to check the off-track shown in FIG. 4.

FIG. 8B shows an example of the off-track detection check (S405) shown in FIG. 4. After the initialization of the check time (S801), the delay profile is observed (S802) as an output given halfway in the measurement process. If a path is detected that exceeds the path selection level during the operation of determining whether there is a path exceeding the path selection level (S803), the check time is initialized (S804) and it is determined that an off-track did not occur (S805). If there is no path detected that exceeds the path selection level, the check time is incremented (S806), and the check time and the off-track detection protection time are compared with each other (S807). It is determined that an off-track has occurred (S808), if the check time is equal to or longer than the off-track protection time, in other words, if the period of no path that exceeds the path selection level is equal to or longer than the off-track protection time. Note that the path selection level and the off-track protection time are parameters that are set by the user as the off-track check conditions.

Figure 9A:
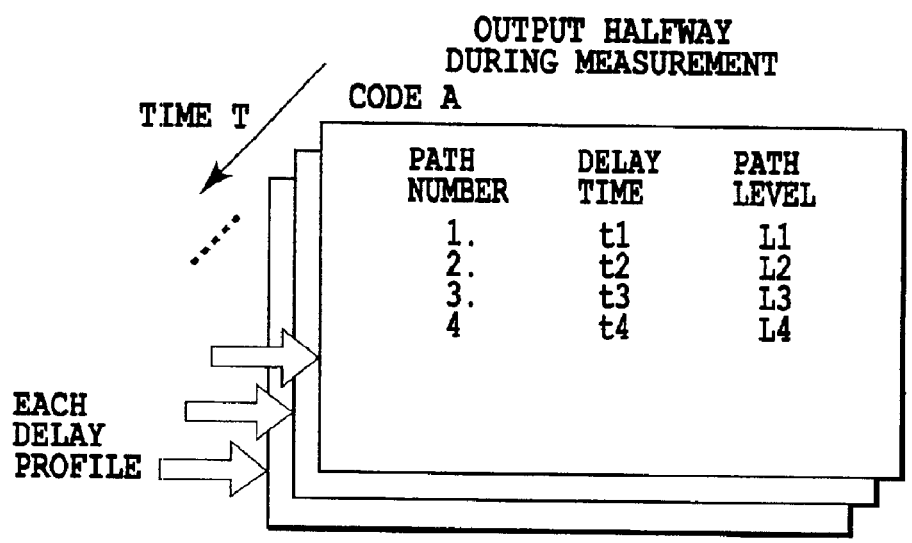
FIG. 9A is a schematic diagram illustrating an example of acquiring delay profile.
Figure 9B:
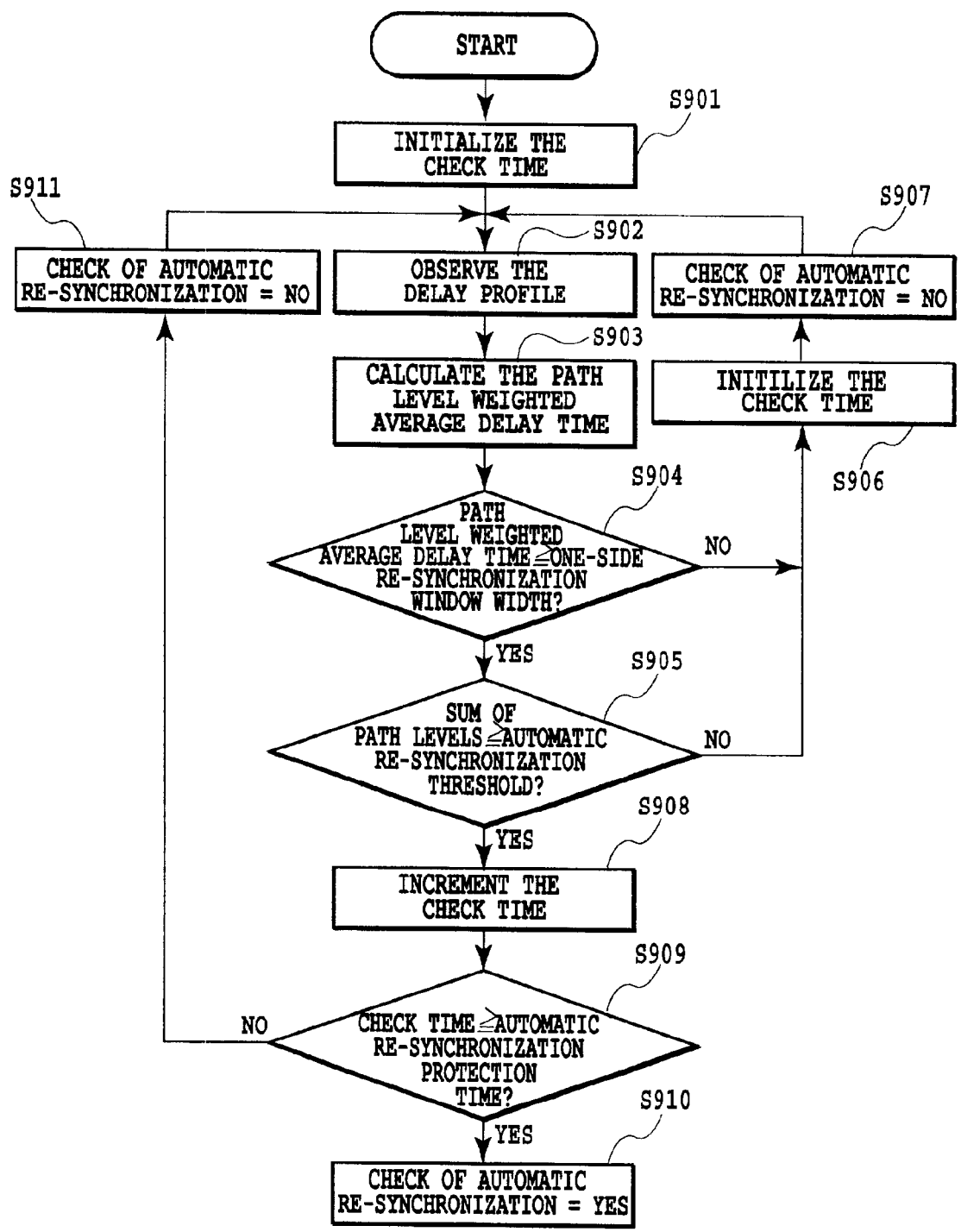
FIG. 9B is a flow chart illustrating an example of how to check the automatic re-synchronization shown in FIG. 4.

FIG. 9B shows an example of the automatic re-synchronization check (S407) shown in FIG. 4. After the initialization of the check time (S901), the delay profile is observed (S902) as an output given halfway in the measurement process. Next, the path level weighted average delay time is calculated (S903) and it is determined whether it exceeds the width of the one-side re-synchronization window or not (S904). Further, it is also determined whether the sum of the path levels exceeds the automatic re-synchronization threshold or not (S905). If either answer is NO, the check time is initialized (S906) and it is determined that the automatic re-synchronization will not be conducted (S907). If both answers are YES, the check time is incremented (S908) and compared with the automatic re-synchronization protection time (S909).

It is determined that the automatic re-synchronization will be carried out (S910) if the check time is equal to or longer than the automatic re-synchronization protection time, in other words, if the pulse level weighted average delay time exceeds the width of the one-side re-synchronization window and the existent period of path where the sum of path levels exceeds the automatic re-synchronization threshold is equal to or longer than the automatic re-synchronization protection time. Note that the width of the one-side re-synchronization window, the automatic re-synchronization threshold and the automatic re-synchronization protection time are parameters that can be set by the user as the automatic re-synchronization check conditions.

Figure 10:
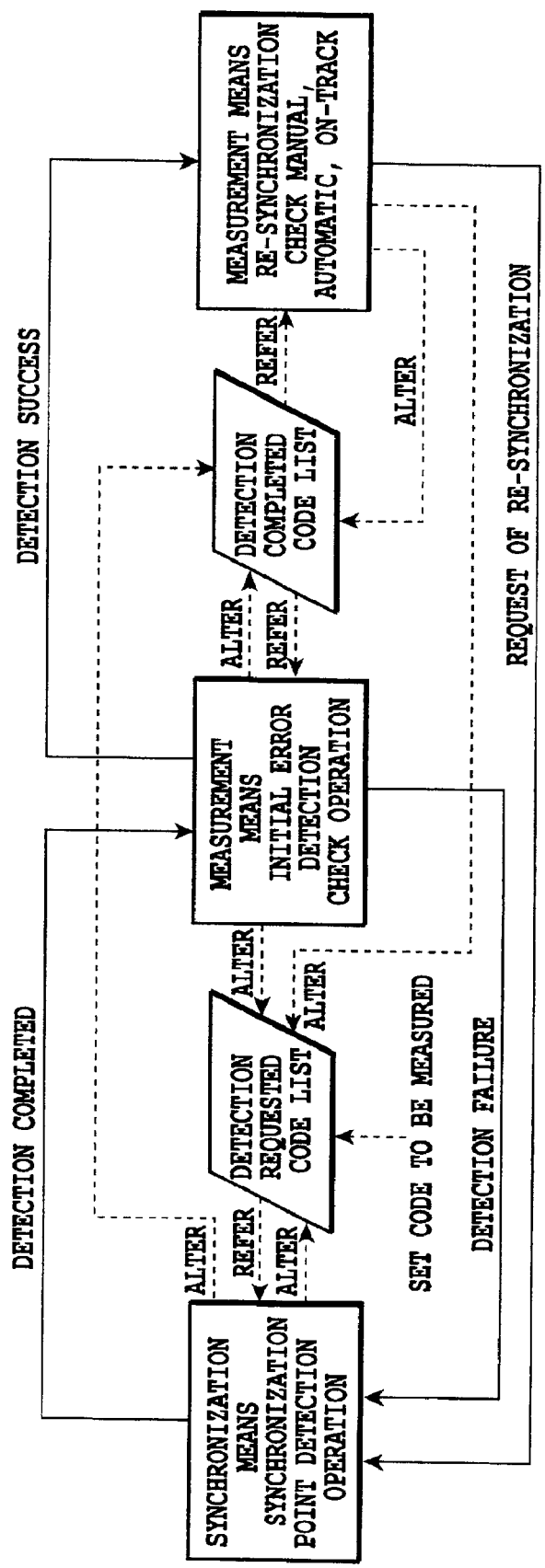
FIG. 10 is a diagram illustrating how to use the detection requested code list and detection completed code list according to the invention.

FIG. 10 shows the method using a detection requested code list and a detection completed code list. In order to receive and handle the signals sent from more than one base station through CDMA pilot channels in parallel at a time, the detection requested code list and the detection completed code list are used. FIG. 10 demonstrates how the three operations, namely, the synchronization point detection operation conducted in the synchronization unit 121, initial error detection check operation in the measurement unit 122 and re-synchronization check operation (manual, automatic, off-track) in the measurement unit 122, and the detection requested code list and detection completion code list are related with one another.

First, the detection requested code list is initialized by the measurement code settings determined by the user. The measurement code settings describe the numbers of the codes that will be measured, names of the base stations as reference information and search numbers for list scanning. The detection requested code list is the code list of the codes that will be detected. The listed codes are referred to, from their top on the list, by the synchronization unit 121 for synchronization point detection. The code of which detection has been completed is removed from the detection requested code list and then transferred to the detection completion code list. The descriptions of the detection completed code list are the same as those of the detection requested code list except that the information about synchronization points is added in the completed code list.

The measurement unit 122 conducts initial error detection on the codes described in the detection completed code list. If the initial error detection is determined as a failure, the corresponding code is removed from the detection completed code list and then transcribed on the detection requested code list so that the operation is returned to the synchronization unit 121. If the initial error detection is determined as successful, the storage operation begins in the measurement unit 122 and re-synchronization check operation starts. The code for which re-synchronization starts is removed from the detection completed code list for re-synchronization according to the setting, either of manual, automatic or on-track. Afterward, it is transferred to the detection requested code list and the operation is returned to the synchronization unit 121. If the mode of re-synchronization check is set at "automatic", the synchronization detection must be made with the current data measurement being continued. Thus the code is described on the detection requested code list, while it remains in the detection completed code list.

FIGS. 11A to 11D show examples of the measurement code settings, detection requested code list and detection completed code list. FIG. 11A shows the example of measurement code settings, where a user has specified eight codes with the code numbers 3, 6, 9, 55, 120, 378, 412, 501. FIG. 11B shows a detection requested code list that has been initialized according to the measurement code settings. FIG. 11C shows the state of a detection requested code list after the detentions of code 3 and code 6 have been completed. FIG. 11D shows a detection completed code list. The synchronization point is detected in the order of the search numbers described on the detection requested code list.

FIGS. 12A, 12B, 13A and 13B show examples of the synchronization point detection for the case where the re-synchronization mode is set at the automatic re-synchronization. After the start of operation, the setting of re-synchronization mode is read out (S1201). If its mode is determined to be "automatic", the processing flow branches to a flow of synchronization detection or the other flow of re-synchronization detection.

Figure 12B:
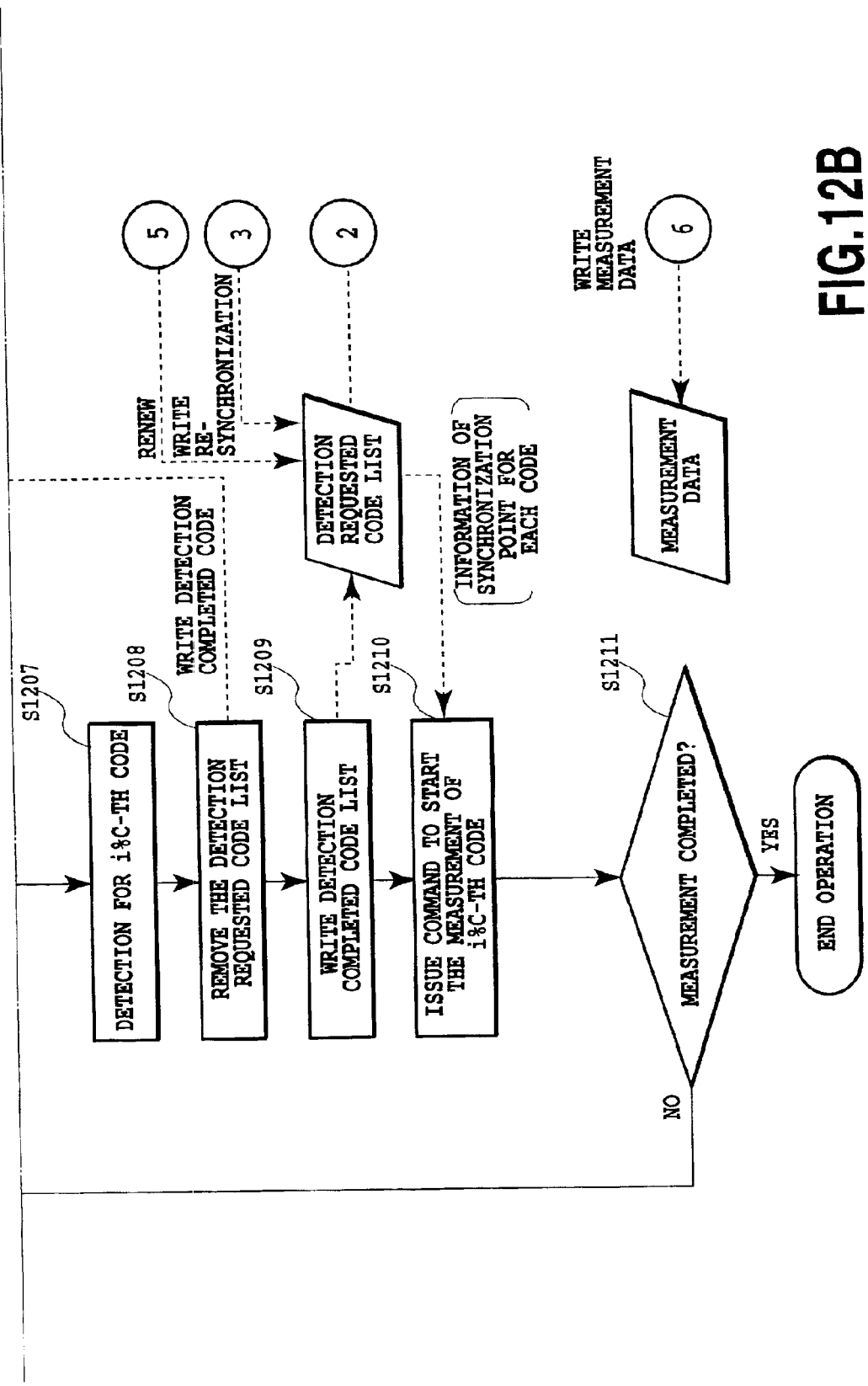

FIGS. 12A and 12B show examples of synchronization detection. First, the measurement code settings are read (S1202) and the detection requested code list is initialized (S1203). Next, according to the list search numbers, the codes on the detection requested code list are referred to (S1205) and the detection request is examined (S1206). If there is a detection request code on the list, the detection is started (S1207). When the detection is completed for a code, the code number is removed from the detection requested code list (S1208), the code number and the synchronization point are saved (S1209) in the record of the same search number on the detection completed code list. The scanning of the detection requested code list based on the search number is constantly continued during measurement (S1211, S1212). Therefore, if the code number is described on the detection requested code list, its detection is conducted instantaneously. In the figures that follow, X%Y represents the remainder given when X is divided by Y, and && represents logical multiplication.

Figure 13B:
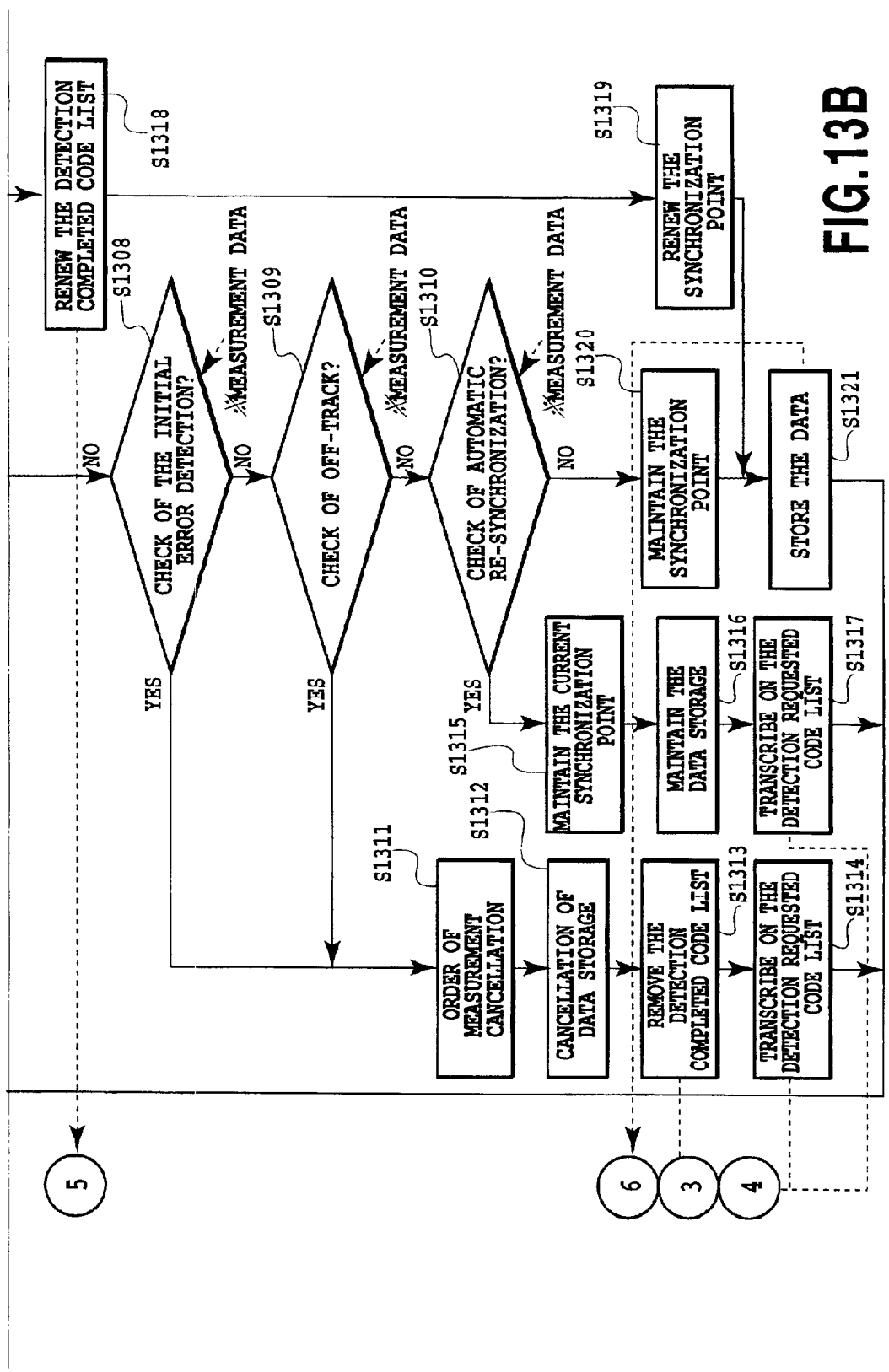

FIGS. 13A and 13B show examples of the re-synchronization detection operation. First, the initial error detection check condition (S1301), automatic re-synchronization check condition (S1302) and off-track check condition (S1303) are read, and then the detection completed code list is referred to (S1305). Next, it is determined whether detection is completed or not (S1306), and the code of which code number and synchronization point are described on the detection completed code list is subject to the following check.

Namely, based on the check conditions and measurement data, the automatic re-synchronization failure/success check (S1307), initial error detection check (S1308), off-track check (S1309) and automatic re-synchronization check (Sl310) are carried out. If an initial error detect check is carried out, the operation is returned to the detection process after the issue of a measurement cancellation order (S1311), data storage cancellation (S1312), removal from the detection completed code list (S1313), and transfer to the detection requested code list (S1314). The same operations are executed if an off-track check is conducted. When an automatic synchronization check is conducted, the code is listed on the detection requested code list (S1317) and the operation is returned to the detection process, while the current synchronization point (S1315) and data saving (S1316) are continued.

During the check of failure or success in the automatic re-synchronization check (S1307), the initial error detection check at the new synchronization point tells whether or not a new better synchronization point is found under the automatic re-synchronization. If the result of automatic re-synchronization check is YES, the detection completed code list is renewed to a new one for the new synchronization point (S1318), the synchronization point being thereby renewed (S1319). If all the checks have failed and the current synchronization point is determined as the best one, the current synchronization point is maintained (S1320) and data storage starts (S1321).

FIGS. 14A, 14B, 15A and 15B show examples of the synchronization point detection for the case where the re-synchronization mode is set at the manual re-synchronization. After the start of operation, the setting of the re-synchronization mode is read (S1401). If its mode is determined to be set at "manual", the operation branches to a flow of synchronization detection or the other flow of re-synchronization check.

Figure 14B:
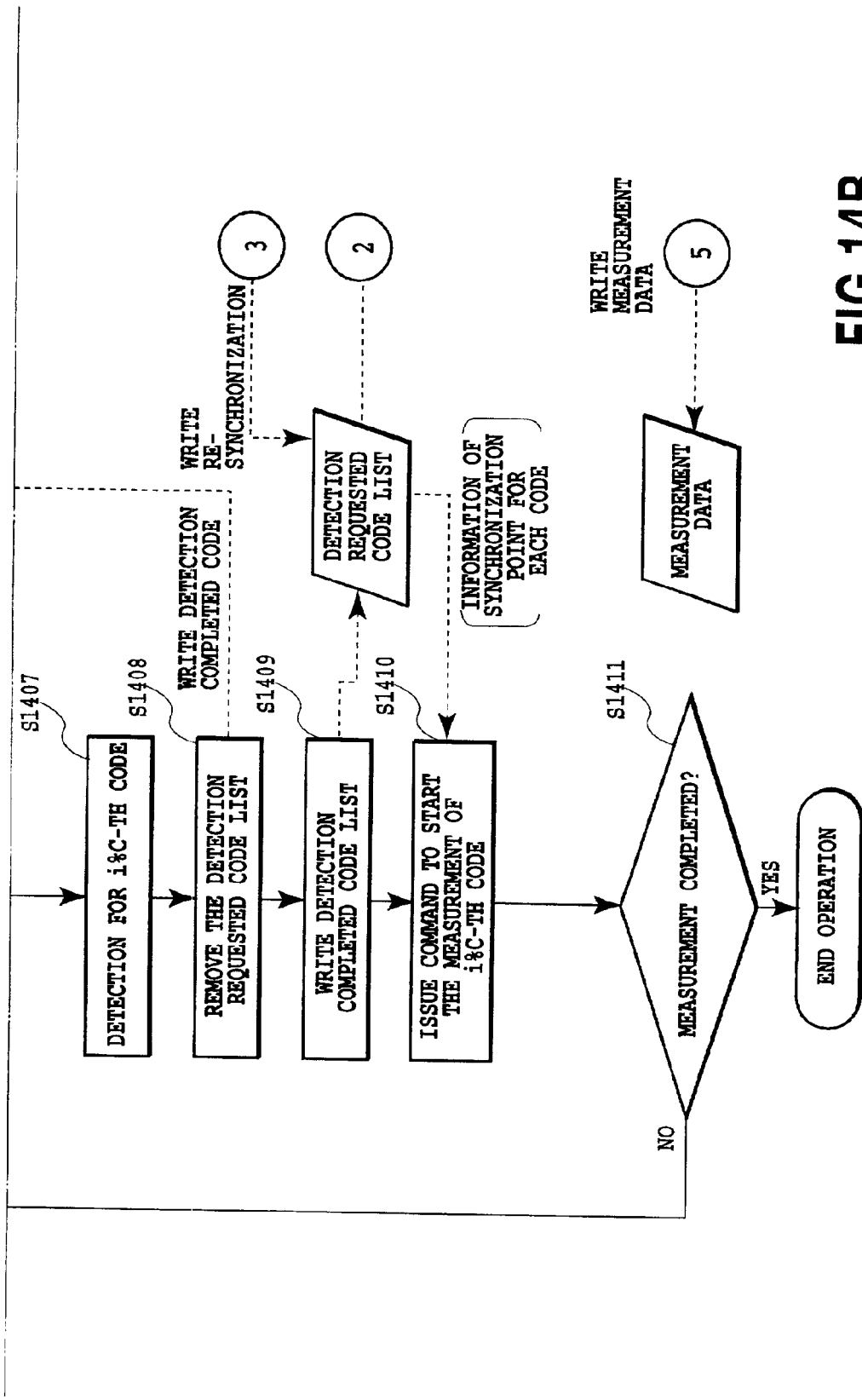

FIGS. 14A and 14B show examples of the synchronization detection operation. Its flow is all the same as that for the case of the automatic re-synchronization (FIG. 12A and 12B).

Figure 15B:
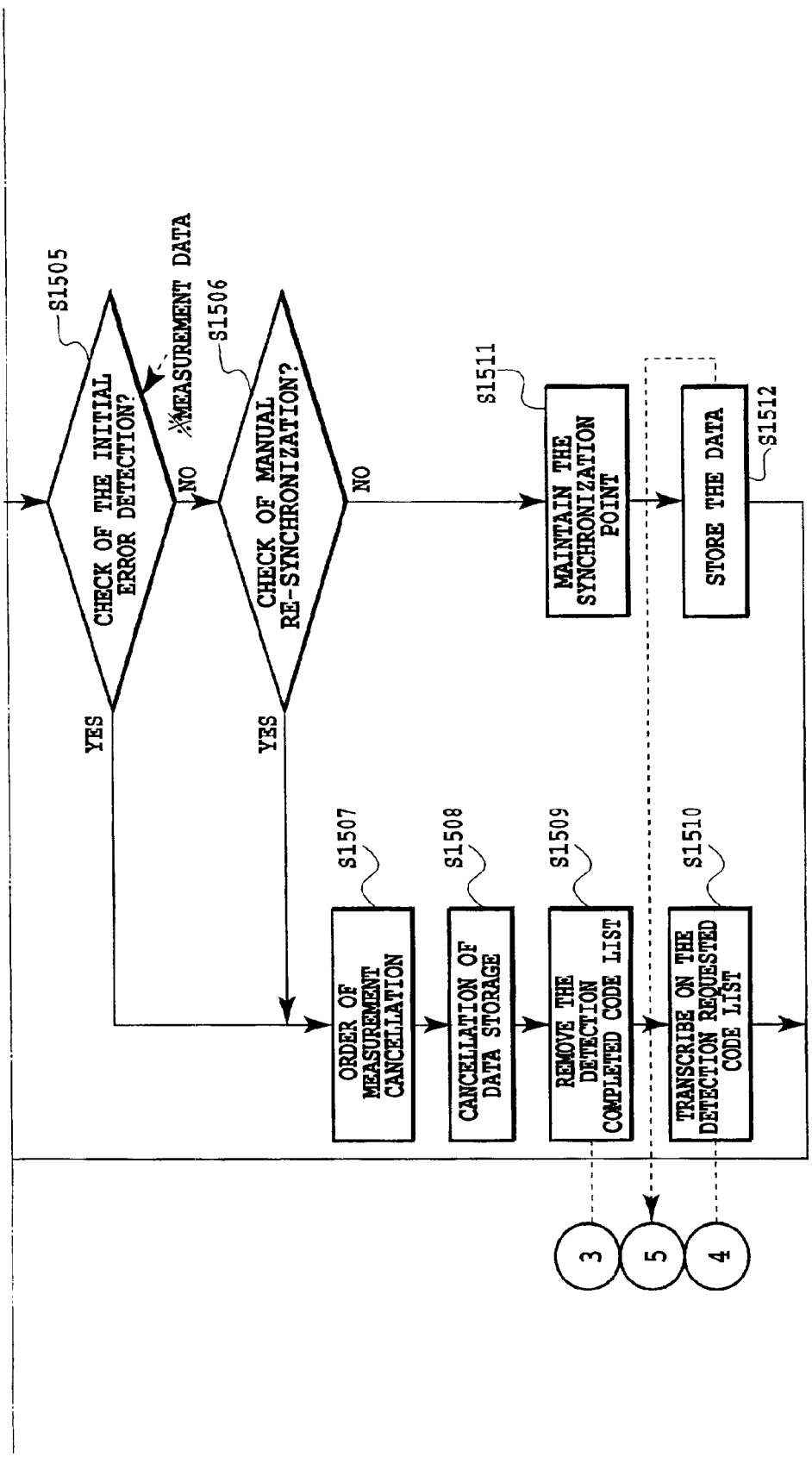

FIGS. 15A and 15B show examples of the re-synchronization check. First, the initial error detection conditions are read (S1501) and then the detection completed code list is referred to according to the search number (S1503). Next, it is determined whether the detection is over or not (S1504). The code of which code number and synchronization point are described on the detection completed code list is subject to the following check. If a code on the detection completed code list is determined to pass the initial error detection check (S1505) or a manual re-synchronization is ordered (S1506), the measurement (S1507) and data saving (S1508) are canceled. Then the code is removed from the detection completed code list (S1509) and moved to the detection requested code list (S1510) to make the process return to synchronization detection. Unless the code passes those checks, the current synchronization point is maintained (S1511) and data saving (S1512) is continued.

Figure 16A:
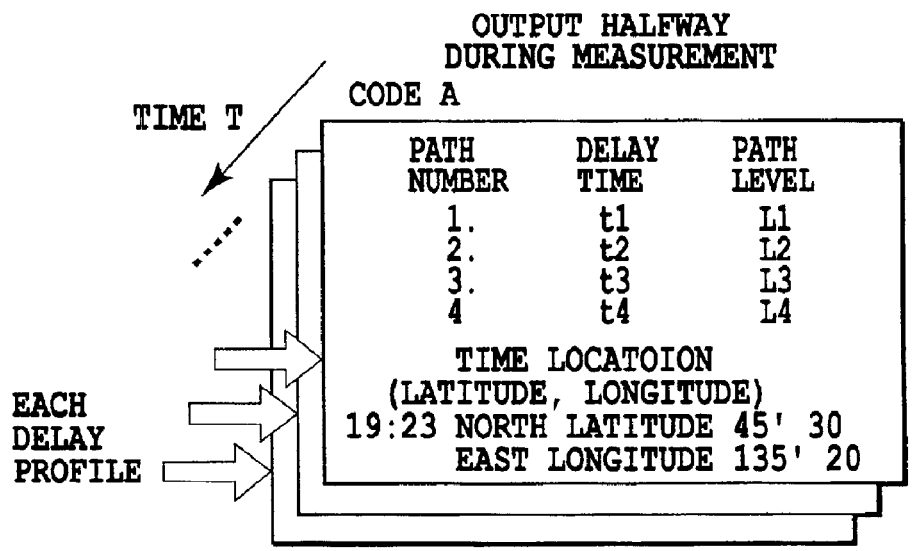
FIGS. 16A and 16B are diagrams illustrating examples of the output provided halfway during measurement according to the invention.
Figure 16B:
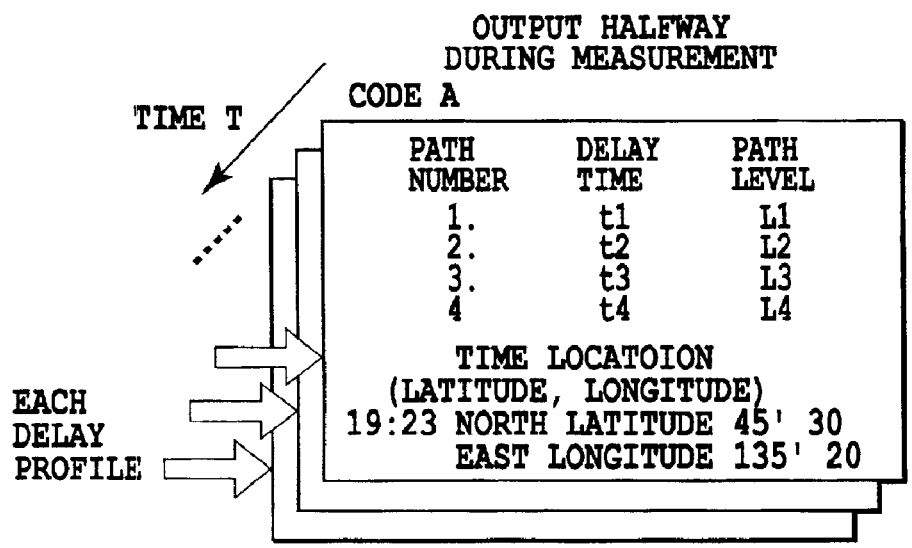

FIGS. 16A and 16B show the examples of an output given halfway in the measurement process according to the invention. FIGS. 16A and 16B demonstrate an output given halfway in the measurement process obtained in parallel for each code as the result of the operations in FIGS. 10 to 15A and 15B. In the examples shown in FIGS. 16A and 16B, the output is provided along with the information of time and location. This enhances the effectiveness of the data acquired as delay profile.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

What is claimed is:

1. A communication quality acquisition apparatus comprising:

an acquisition means for receiving the CDMA pilot channels sent from a plurality of wireless base stations through the use of spread signals different from each other, detecting the synchronization point for an off-track spread signal, and optimizing a width of a measurement window for an on-track spread signal by increasing the frequency of the synchronization and refreshing the measurement window to narrow the measurement window to acquire delay profile based on said spread signals in said CDMA pilot channels; and a storage means for storing the meaningful delay profile of said on-track spread signal acquired by said acquisition means.

2. The communication quality acquisition apparatus according to claim 1, wherein said acquisition means comprises:

a synchronization means for detecting the synchronization point based on said spread signals in said CDMA pilot channels;

a measurement means for acquiring delay profile by reverse spreading said spread signals in said CDMA pilot channels; and a control means for controlling said synchronization means and measurement means.

3. The communication quality acquisition apparatus according to claim 2, wherein said control means controls said synchronization means and measurement means based on the conditions set by the user for initial error detection check, re-synchronization of each mode, off-track check and automatic re-synchronization check, or on information set for the code that will be measured.

4. The communication quality acquisition apparatus according to claim 2, wherein said control means controls said measurement means based on the synchronization point information acquired by said synchronization means.

5. The communication quality acquisition apparatus according to claim 2, wherein said control means controls said synchronization means based on the check results of initial error detection, automatic re-synchronization or off-track acquired by said measurement means.

6. A communication quality acquisition method comprising:

the acquisition step of receiving CDMA channels sent from a plurality of wireless base stations through the use of spread signals different from each other, detecting the synchronization point for an off-track spread signal, and optimizing a width of a measurement window for an on-track spread signal by increasing the frequency of the synchronization and refreshing the measurement window to narrow the measurement window to acquire delay profile based on said spread signals in said CDMA channels; and the storage step of storing the meaningful delay profile of said on-track spread signal acquired by said acquisition step.

7. The communication quality acquisition method according to claim 6, wherein said acquisition step comprises:
- the synchronization step of detecting the synchronization point based on said spread signals in said CDMA pilot channels;
- the measurement step of acquiring delay profile by reverse spreading said spread signals in said CDMA pilot channels; and
- the control step of controlling said synchronization step and measurement step.

8. The communication quality acquisition method according to claim 7, wherein at said control step said synchronization step and measurement step are controlled based on the conditions set by the user for initial error detection check, re-synchronization of each mode, off-track check and automatic re-synchronization check, or on information set for the code that will be measured.

9. The communication quality acquisition method according to claim 7, wherein said control step controls said measurement step based on the synchronization point information acquired at said synchronization step.

10. The communication quality acquisition method according to claim 7, wherein said control step controls said synchronization step based on the check results of initial error detection, automatic re-synchronization or off-track.

* * * * *

UNITED STATES PATENT AND TRADEMARK OFFICE
CERTIFICATE OF CORRECTION

| | | |
|---|---|---|
| PATENT NO. | : 6,968,197 B2 | Page 1 of 1 |
| APPLICATION NO. | : 09/825817 | |
| DATED | : November 22, 2005 | |
| INVENTOR(S) | : Mori et al. | |

It is certified that error appears in the above-identified patent and that said Letters Patent is hereby corrected as shown below:

On the Title Page,
Item (56), under "OTHER PUBLICATIONS", line 2, change "Sustems", to --Systems,"--

Column 1,
Line 25, change "of spatially" to --spatially of--
Line 53, change "such problems that" to --problems, for example that--

Column 2,
Lines 12-13, change "efficiently detect meaningful delay profile." to
--the efficient detection of a meaningful delay profile--
Line 25, change "enables to reduce" to --reduces--
Line 26, change "acquire" to --acquires--
Line 34, change "enables to conduct" to --conducts--
Line 48, change "to reduce fails" to --the reduction of failures--
Line 55, change "enables to narrow" to --narrows--
Line 62, change "enables to raise" to --raises--

Column 3,
Line 6, change "enables to reduce" to --reduces--
Line 7, change "acquire" to --acquires--
Line 15, change "enables to conduct" to --conducts--
Line 28, change "enables to reduce" to --reduces--
Line 35, change "enables to narrow" to --narrows--
Line 41, change "enables to raise" to --raises--

Column 5,
Line 66, after "determined to" change "do" to --be done--

Signed and Sealed this

Fifth Day of January, 2010

David J. Kappos
*Director of the United States Patent and Trademark Office*